United States Patent [19]
Tsuda et al.

[11] Patent Number: 5,805,814
[45] Date of Patent: Sep. 8, 1998

[54] VIDEO GAME SYSTEM

[75] Inventors: Yoichiro Tsuda; Kazuhiro Watanabe, both of Tokyo, Japan

[73] Assignee: Pioneer Electronic Corporation, Tokyo, Japan

[21] Appl. No.: 911,184

[22] Filed: Aug. 14, 1997

Related U.S. Application Data

[63] Continuation of Ser. No. 516,332, Aug. 17, 1995, abandoned.

[30] Foreign Application Priority Data

Sep. 5, 1994 [JP] Japan ................................... 6-235995

[51] Int. Cl.⁶ .................................................. A63B 71/06
[52] U.S. Cl. ............................... 395/200.47; 395/200.33; 348/6; 348/7; 348/12; 348/13
[58] Field of Search .................... 395/200.47, 200.33, 395/200.49, 200.57, 200.61, 200.68; 373/434, 438, 439; 348/6, 7, 12, 13

[56] References Cited

U.S. PATENT DOCUMENTS

| | | | |
|---|---|---|---|
| 4,896,209 | 1/1990 | Matsuzaki et al. | 348/8 |
| 5,051,822 | 9/1991 | Rhoades | 463/25 |
| 5,423,555 | 6/1995 | Kidrin | 463/31 |

*Primary Examiner*—Thomas Peeso
*Attorney, Agent, or Firm*—Nikaido, Marmelstein, Murray & Oram LLP

[57] ABSTRACT

A video game system has a host and a terminal device connected to the host through a transmission line. The terminal device has a plurality of game units on which a video game program is played. A first memory is provided in the host wherein a plurality of video game programs are stored. The video game program is transmitted to the terminal device. A second memory is provided in the terminal device for storing the video game programs transmitted from the host. A third memory is provided in the game unit for storing information on playing condition of the video game program. A video game program stored in the second memory is determined to be replaced by a new video game program stored in the first memory in accordance with the information stored in the third memory. The new video game program is transmitted to the terminal.

5 Claims, 17 Drawing Sheets

FIG.10

| VIDEO GAME PROGRAM (188 BYTE) | CORRECTING CODE (20 BYTE) | CRC CODE (16 OR 32 BYTE) |
|---|---|---|

VIDEO GAME SYSTEM

This application is a continuation of application Ser. No. 08/516,332 filed Aug. 17, 1995, now abandonded.

BACKGROUND OF THE INVENTION

The present invention relates to a video game system having a host and a plurality of terminal devices each connected to the host through a transmission line and having a plurality of video game units.

Of various video game units installed in an amusement facility, some have memory devices such as a RAM and ROM wherein a video game program played on the game unit is stored. By setting another memory device, or by changing the program stored therein, various games can be played on the same unit. In such a game unit, an unpopular game which is not often played, can be quickly replaced with another.

Namely, the management of the amusement facility counts up the number of times each video game program was played and by analyzing the result, makes a request to a video game supplier to change the program. The supplier accordingly replaces the program in the memory device, or the whole memory device storing the program.

Such a system requires the management of the amusement facilities to constantly monitor the playing condition of each game unit. The management must also make a request to change the program to the supplier. These operations are quite troublesome.

SUMMARY OF THE INVENTION

An object of the present invention is to provide a video game system where the game programs are changed as appropriate in accordance with the playing rate of the game, thereby releasing the management of the game unit from burdensome operations.

According to the present invention, there is provided a video game system having a host and a terminal device connected to the host through a transmission line and having a plurality of game units, comprising a first memory provided in the host wherein a plurality of video game programs are stored, transmitting means for deriving a video game program from the first memory and for transmitting the program to the terminal device, a second memory provided in the terminal device for storing the video game programs transmitted from the host, a display provided on each of the game units for displaying the video game program stored in the second memory, and operating means for operating the game.

A third memory is provided for storing information on playing condition of each of the video game programs, and determining means is provided in the host for determining a video game program stored in the second memory to be replaced be another video game program stored in the first memory in accordance with the information stored in the third memory, and for instructing the transmitting means to transmit the video game program stored in the first memory to the terminal.

The other objects and features of this invention will become understood from the following description with reference to the accompanying drawings.

BRIEF DESCRIPTION OF DRAWINGS

FIG. 10 is an illustration showing a format of data transmitted in the system of the present invention.

DETAILED DESCRIPTION OF THE PREFERRED EMBODIMENTS

Figure 1:
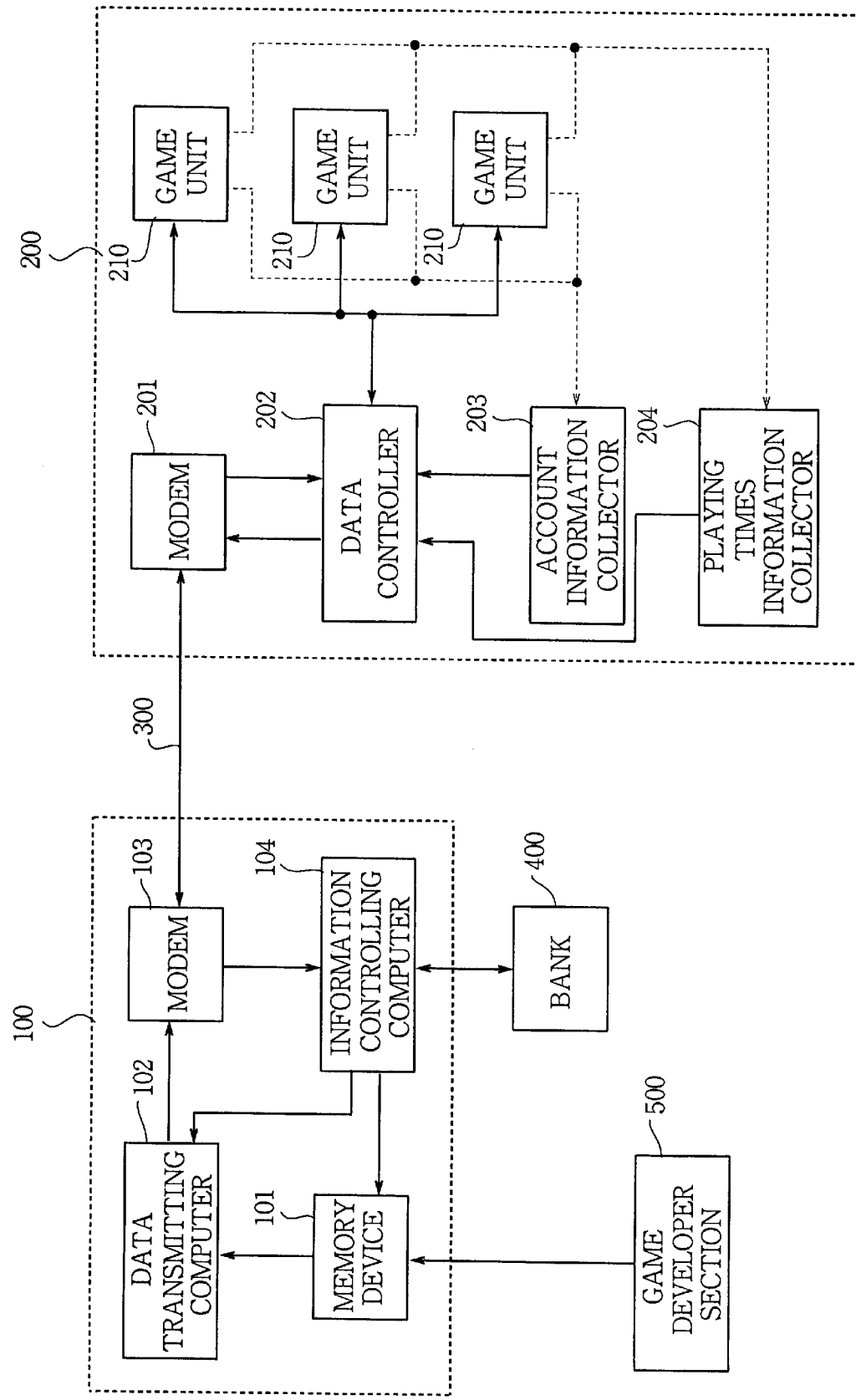
FIG. 1 is a block diagram of a video game system according to the present invention.

Referring to FIG. 1, a video game system according to the present invention comprises a host 100 of a game supplier and a plurality of terminal devices 200 each provided at amusement facilities or homes and connected to the host 100 through a transmission line 300. Only one of the terminal devices 200 is shown in the figure for the ease of explanation.

Provided in the host 100 are an information controlling computer 104 for controlling the operation of the host 100, a memory device 101 comprising a floppy disc or a hard disc, a data transmitting computer 102 for processing information stored in the memory device 101 for transmission, and a data transmitting modem 103. The memory device 101 stores a single or a plurality of video game programs and playing instructions for each game program and an identification program ID of each game program. A plurality of memory devices 101 are provided when only one program is stored in one device. The memory device 101 is connected to a game developer section 500 which develops various game softwares. The softwares are applied to the memory disc 101 through a transmission line or stored in a memory medium which is carried from the developer section 500 and installed in the memory device 101. The program ID code allotted to each game program is also stored in an internal memory of the information controlling computer 104 together with a terminal ID code of each of the terminal devices 200 connected to the host and a game unit ID code of each of the game units provided in the terminal devices.

Upon operation of the information controlling computer 104, the information such as the video game program and the playing instructions thereof is derived from the memory device 101 and fed to the data transmitting computer 102 so as to be processed. The data is further fed to the modem 103 which modulates the data so as to be fit to be transmitted to the terminal device 200 through the transmission line 300.

The modem 103 demodulates data transmitted from the terminal device 200 to the host 100 through the transmission line 300. The transmitted data are, for example, an account information, that is an amount of money accumulated for playing each game, and playing times information on how many times each game was played. The data are fed to the information controlling computer 104 wherein the charge account of each terminal device 200 is calculated based on the information. The information controlling computer 104 is connected to banks 400, local post offices and other banking organs to which the account is fed. Hence, the game charge is drawn from a bank account of each user of the terminal device 200 through an online system.

The terminal device 200 comprises a data transmitting modem 201 connected to the modem 103 of the host through the transmission line 300, data controller 202 and a plurality of game units 210. The video game program and the playing instructions transmitted from the host 100 are demodulated by the modem 210 and fed to the data controller 202 where error check and correcting operation thereof are executed. The accurate game programs and instructions are applied to each game unit 210. The data controller 202 has a memory for storing the terminal ID code of the present terminal device 200 and the unit ID codes of the game units 210 connected thereto.

Figure 2:
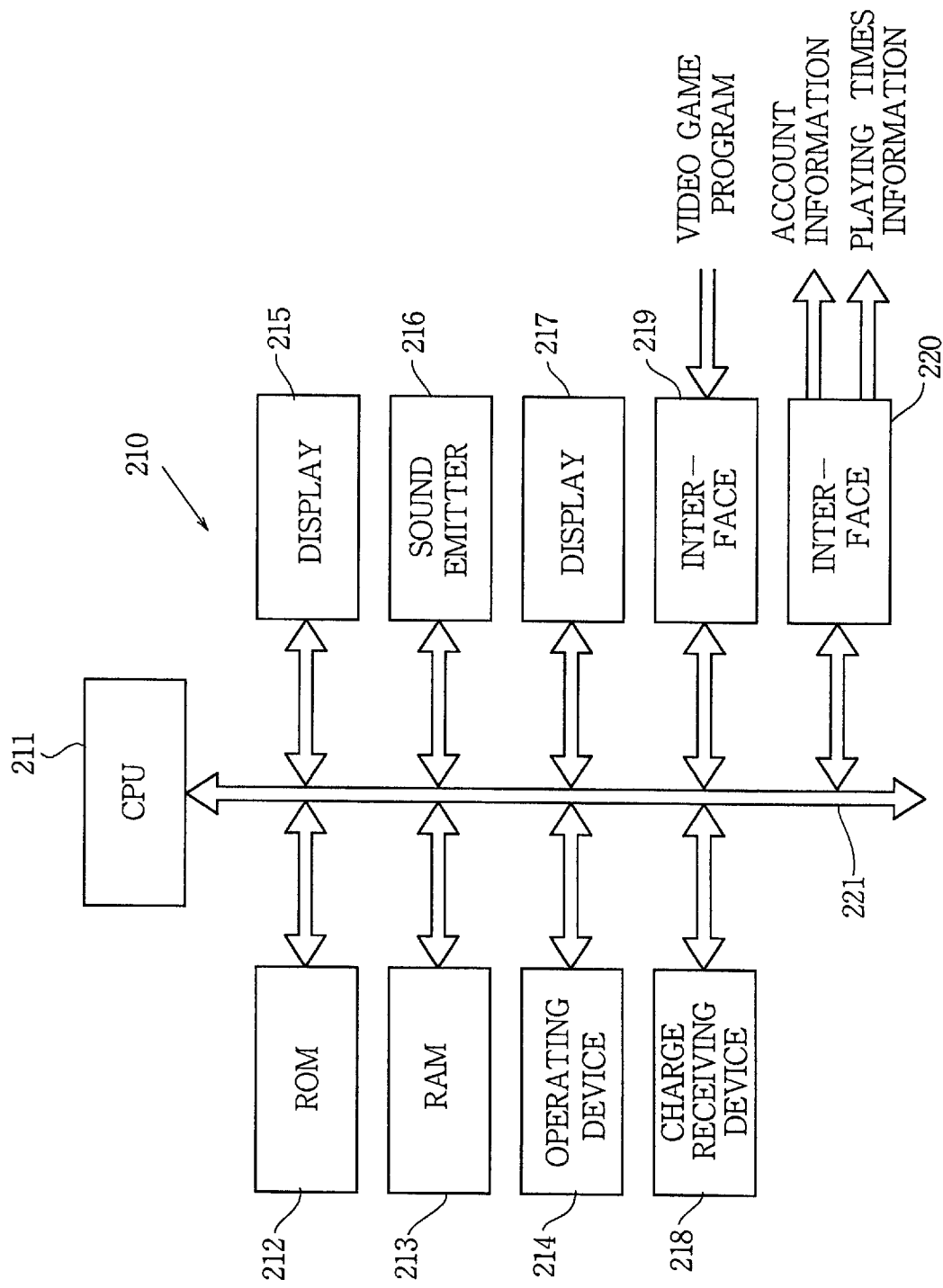
FIG. 2 is a block diagram of a game unit provided in the system of FIG. 1.

Referring to FIG. 2, each of the game units 210 is connected to the data controller 202 through interfaces 219 and 220. The game unit 210 comprises a CPU 211 for controlling the overall operation of the game unit, ROM 212 which stores a program for operating the CPU 211, RAM 213 for storing a plurality of video game programs, for example, four programs, transmitted from the host 100 and the ID codes thereof.

Further provided in the game unit 210 are an operating device 214 for selecting one of the video program stored in the RAM 213 and playing the game, display 215 such as a CRT display on which the game is shown, sound emitter 216 which emits sound effects accompanying the game, small-sized display 217 such as a liquid-crystal display for showing the playing instructions of the game, and a charge receiving device 218 in which a player inserts coins, bills or token money for playing the game. The devices provided in the game unit 210 are connected to each other through a bus 221.

Referring back to FIG. 1, the terminal device 200 is further provided with an account information collector 203 and a playing times information collector 204, each connected to the game unit 210 through the interface 220.

More particularly, in order to pay a video game on the game unit 210, a player inserts coins, bills or token money of a predetermined amount in the charge receiving device 218 thereof, and by operating the operating device 214, selects a game program of his choice stored in the RAM 213. The CPU 211 determines that a sufficient amount of money is inserted before executing the selected program. The account, together with the unit ID code and the program ID code are applied to the account information collector 203 through the interface 220 and stored therein. Furthermore, each time a video game is played, the program ID code thereof and the unit ID code are applied as the playing times information to the playing times information collector 204 through the interface 220 and stored therein. Only one of the account information collector 204 may be provided.

The operation of the video game system is described hereinafter. First of all, the operation for transmitting a video game program from the host 100 to the terminal device is described with reference to FIGS. 3a and 3b, each showing the operation of the information controlling computer 104 of the host 100 and data controller 202 of the terminal device 200, respectively.

Figure 3:
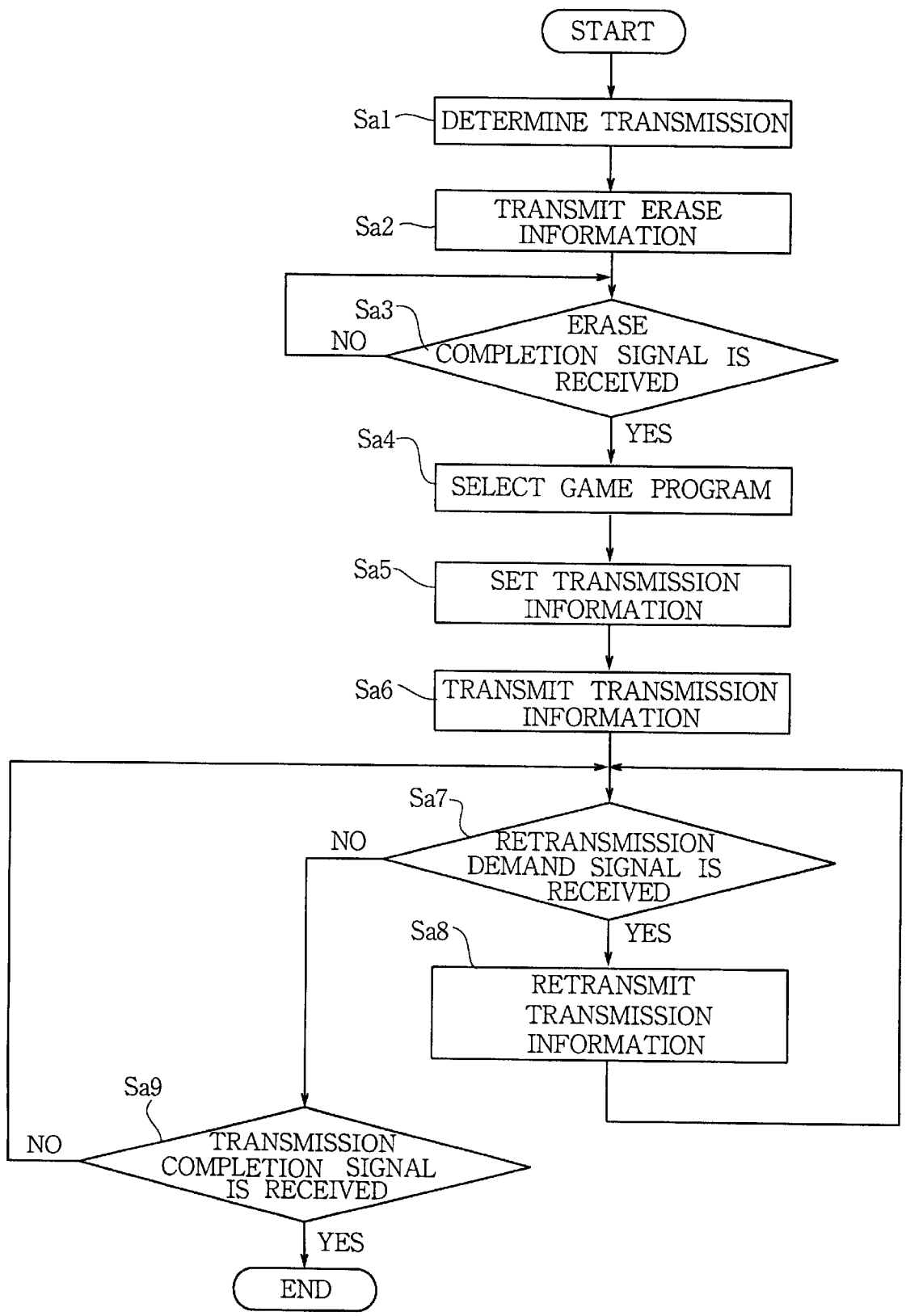
FIGS. 3a and 3b are flowcharts describing operations of a host and a terminal device in the system for transmitting and receiving a video game program, respectively.
Figure 3:
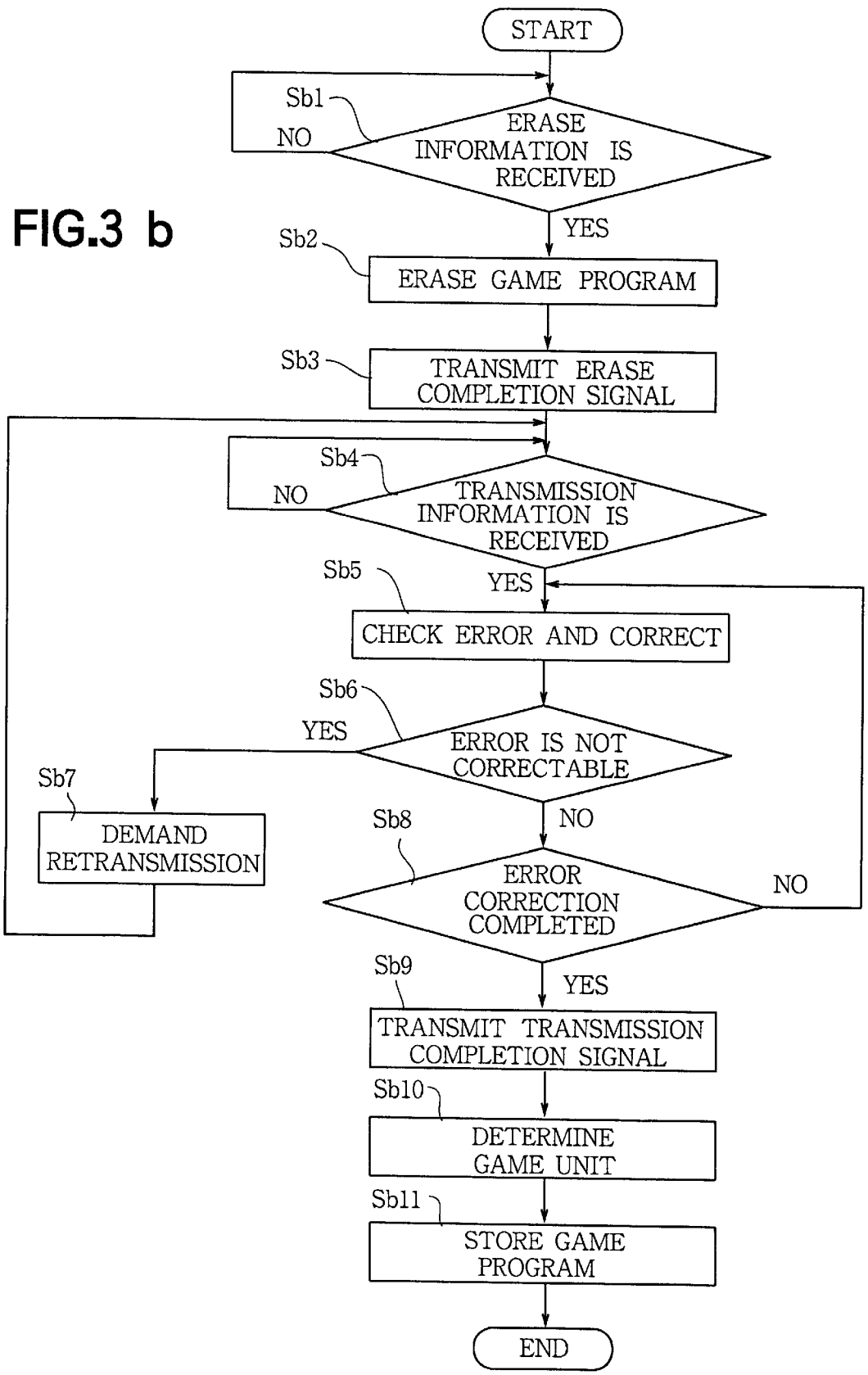

Referring to FIG. 3a, at a step Sa1, the information controlling computer 104 determines that a video game program is to be transmitted to one of the game units 210 of the terminal device 200. More particularly, the transmission of the video game program is executed periodically, upon a request from the user of the terminal device 200, or in accordance with information such as the account and playing times information.

In the case of a periodical, for example, a monthly transmission, the information controlling computer 104 checks the calendar provided therein and determines that the present day is the predetermined date of the transmission. Alternatively, the user of the terminal device 200 makes a request to the host 100 by such means as a telephone call to transmit a new video game program to a determined game unit 210. The operation for determining the transmission based on the information from the terminal device 200 will be later described in detail.

When the transmission is determined at the step Sa1 shown in FIG. 3a, at a step Sa2, the information control computer 104 produces an erase information including an erase instruction, the terminal ID code of the terminal device 200 concerned, the game unit ID code of the game unit 210 which stores the game program to be replaced, and the program ID code of the game program. The erase information is transmitted to the data controller 202 of the appropriate terminal device 200 through the modem 103, transmission line 300 and the modem 201. After the data controller 202 determines that the erase information is received at a step Sb1 of the program in FIG. 3b, the controller 202 compares the terminal ID code included in the erase information with the terminal ID code stored therein. When the ID codes coincide, the controller designates one of the game units 210, the game unit ID code of which is included in the erase information and transmits the erase instruction to the CPU 211 thereof through the interface 219 (FIG. 2). The CPU 211 accordingly makes an access to the game program of the designated program ID which is stored in the RAM 213, thereby erasing the game program in the RAM 213 at a step Sb2. The CPU 211 then produces an erase completion signal which is fed to the data controller 202 and further to the host 100 at a step Sb3.

When the erase completion signal is received at a step Sa3 of FIG. 3a, the information controlling computer 104 selects predetermined one of the plurality of video game programs stored in the memory device 101 at a step Sa4. More particularly, the information controlling computer 104 indicates a program ID code of the selected video game program. An operator of the host 100 sees the ID code and picks out the memory device 101 such as a floppy disc on which the selected program is recorded. The memory device 101 is manually set in the data transmitting computer 102 by the operator.

Alternatively, the information controlling computer 104 applies the program ID code and a game program select instruction to the memory device 101, so that the game program is automatically read out from the memory device 101 and applied to the data transmitting computer 102.

At a step Sa5, the information controlling computer 104 divides the game program into packets and, as shown in FIG. 10, appends to it a cyclic redundancy check (CRC) code for checking errors in the data of the program, and a correcting code for correcting the data. The program ID code, terminal ID code, game unit ID code, and the date of the transmission are further appended to the program, thereby forming a transmission data. The transmission data is fed to the data transmitting computer 102 and further to the modem 103. The modem 103 modulates the data which is then transmitted through the transmission line 300 at a step Sa6.

The transmission data is demodulated at the modem 201 and applied to the data controller 202 at a step Sb4 shown in FIG. 3b. The data controller 202 compares the terminal ID code in the transmission data with that of the present terminal device 200. When the ID codes coincide with each other at a step Sb5, the errors in the demodulated game program are checked in accordance with the CRC code transmitted therewith. When it is determined that there is an error in the program, the data in the game program is corrected in accordance with the correcting code.

When it is determined at a step Sb6 that the error cannot be corrected with the correcting code, the data controller 202 produces a retransmission demand signal which is applied to the host 100 through the modem 201 and the transmission line at a step Sb7.

The information controlling computer 104 of the host 100 accordingly receives the retransmission demand signal through the modem 103 at a step Sa7, and accordingly instructs the data transmitting computer to retransmit the transmission data set therein at the step Sa5. The transmission data is thus again transmitted through the transmission line 300 at a step Sa8.

The steps Sb4 to Sb7 and the steps Sa7 and Sa8 are repeated until the correct data is transmitted to the terminal device 200 and the erroneous data therein is corrected. When it is determined at a step Sb8 that the error check and data correction are completed, a transmission completion signal is fed to the host 100. The operation of the information controlling computer 104 ends with the receipt of the transmission completion signal at a step Sa9.

Meanwhile, the data controller 202 compares the unit ID code included in the transmission data with the unit ID codes stored in a memory thereof and selects the game unit 210 having the transmitted ID code at a step Sb10. The data controller 202 further applies a store instruction to the CPU 211 of the selected game unit 210 so that the transmitted game program and the program ID code thereof are fed through the interface 220 and stored in the RAM 213 at a step Sb11. Thus a new game can be played on the game unit 210.

The transmission completion signal may be transmitted to the host after the game program is stored in the RAM 213.

Figure 4:
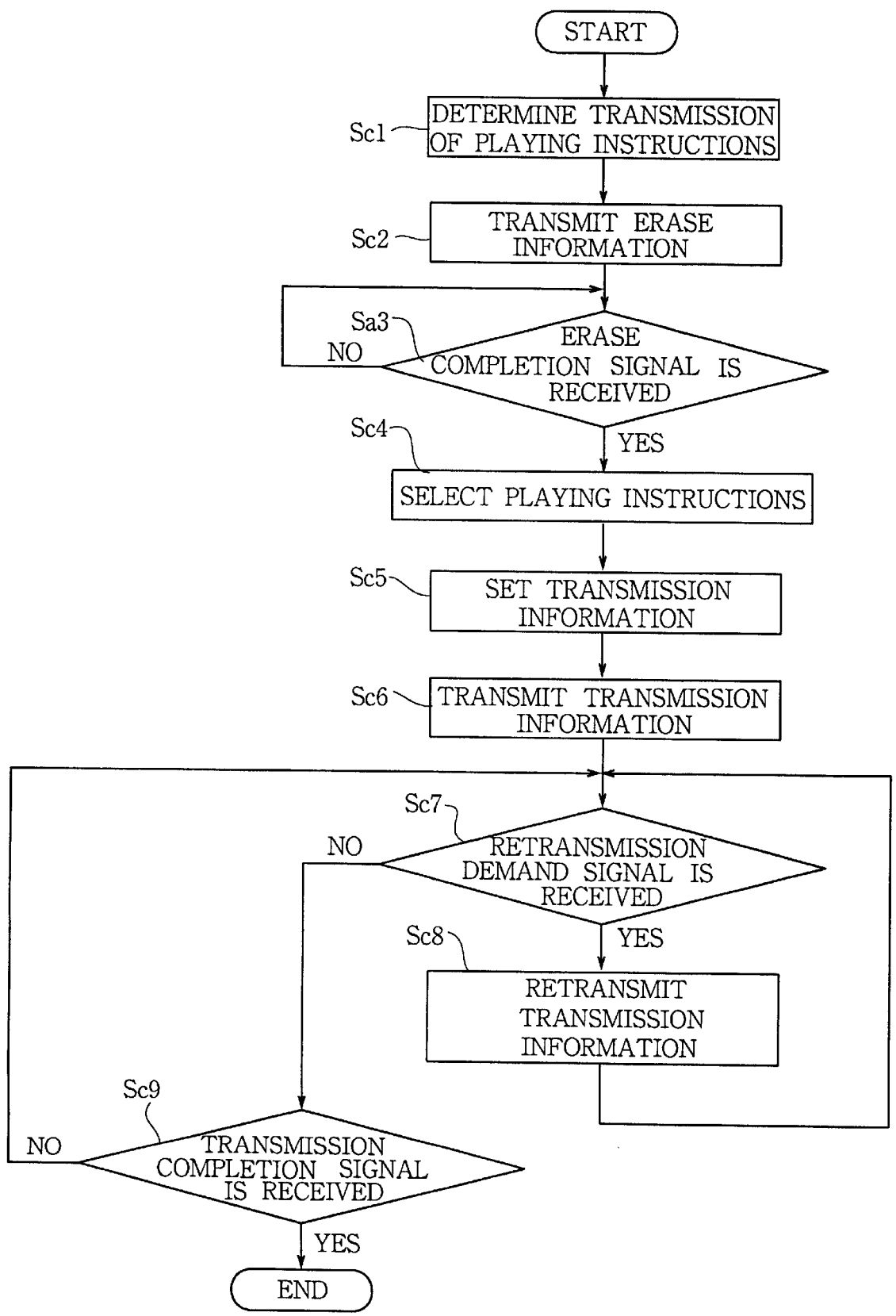
FIGS. 4a and 4b are flowcharts describing operations of the host and the terminal device, respectively, for showing a playing instructions of the video game program.
Figure 4:
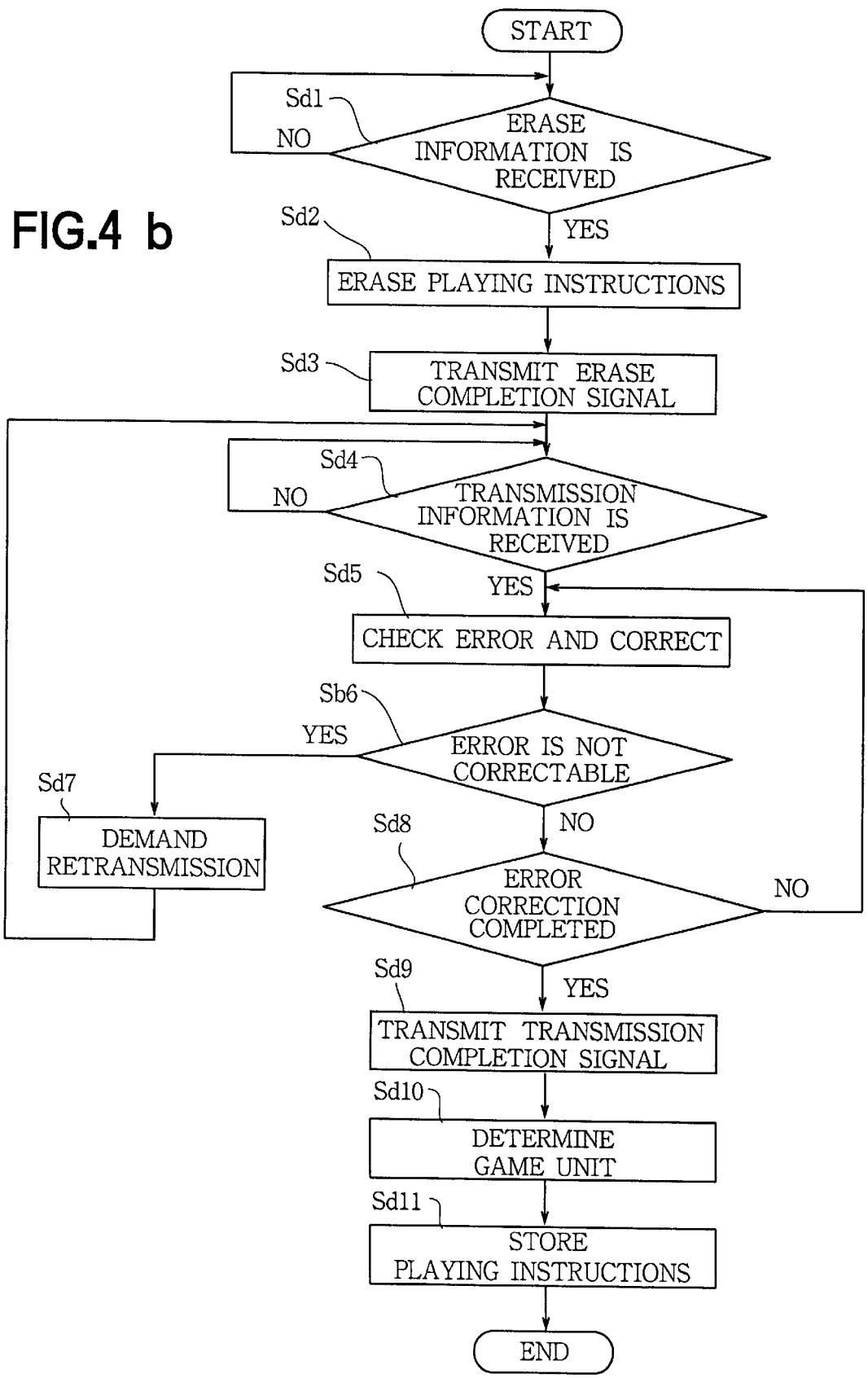

Referring to FIGS. 4a and 4b, playing instructions of the game program are also transmitted from the host 100 to the terminal device 200 before or after the game program is transmitted.

Referring to FIG. 4a, at a step Sc1, the information controlling computer 104 determines that playing instruction are to be transmitted to one of the game units 210 of the terminal device 200 before or after the transmission of the video game program is executed. At a step Sc2, the information control computer 104 produces an erase information including an erase instruction, the terminal ID code of the terminal device 200 concerned, the game unit ID code of the game unit 210 which stores the playing instructions to be replaced, and the program ID code of the game program, the playing instructions of which is to be replaced. The erase information is transmitted to the data controller 202 of the appropriate terminal device 200 through the modem 103, transmission line 300 and the modem 201. After the data controller 202 determines that the erase information is received at a step Sd1 of the program in FIG. 4b, the controller 202 compares the terminal ID code included in the erase information with the terminal ID code stored therein. When the ID codes coincide, the controller 202 designates one of the game units 210, the game unit ID code of which is included in the erase information and transmits the erase instruction to the CPU 211 thereof through the interface 219 (FIG. 2). The CPU 211 accordingly makes an access to the playing instructions of the designated program ID which are stored in the RAM 213, thereby erasing the playing instruction in the RAM 213 at a step Sd2. The CPU 211 then produces an erase completion signal which is fed to the data controller 202 and further to the host 100 at a step Sd3.

When the erase completion signal is received at a step Sc3 of FIG. 4a, the information controlling computer 104 selects playing instructions of the video game program which was or will be transmitted from the playing instructions stored in the memory device 101 at a step Sc4. More particularly, the information controlling computer 104 indicates a program ID code of the selected playing instructions. The operator of the host 100 sees the ID code and picks out the memory device 101 such as a floppy disc on which the selected instructions are recorded. The memory device 101 is manually set in the data transmitting computer 102 by the operator.

Alternatively, the information controlling computer 104 applies the program ID code and a playing instructions select instruction to the memory device 101, so that the playing instructions are automatically read out from the memory device 101 and applied to the data transmitting computer 102.

At a step Sc5, the information controlling computer 104 divides the playing instructions into packets and, as similarly shown in FIG. 10, appends to it a cyclic redundancy check (CRC) code for checking errors in the data of the program, and a correcting code for correcting the data. The program ID code, terminal ID code, game unit ID code, and the date of the transmission are further appended to the playing instructions, thereby forming a transmission data. The transmission data is fed to the data transmitting computer 102 and further to the modem 103. The modem 103 modulates the data which is then transmitted through the transmission line 300 at a step Sc6.

The transmission data is demodulated at the modem 201 and applied to the data controller 202 at a step Sd4 shown in FIG. 4b. The data controller 202 compares the terminal ID code in the transmission data with that of the present terminal device 200. When the ID codes coincide with each other at a step Sd5, the errors in the demodulated game program are checked in accordance with the CRC code transmitted therewith. When it is determined that there is an error in the program, the data in the playing instruction is corrected in accordance with the correcting code.

When it is determined at a step Sd6 that the error cannot be corrected with the correcting code, the data controller 202 produces a retransmission demand signal which is applied to the host 100 through the modem 201 and the transmission line at a step Sd7.

The information controlling computer 104 of the host 100 accordingly receives the retransmission demand signal through the modem 103 at a step Sc7, and accordingly instructs the data transmitting computer to retransmit the transmission data set therein at the step Sc5. The transmission data is thus again transmitted through the transmission line 300 at a step Sc8.

The steps Sd4 to Sd7 and the steps Sc7 and Sc8 are repeated until the correct data is transmitted to the terminal device 200 and the erroneous data therein is corrected. When it is determined at a step Sd8 that the error check and data correction are completed, a transmission completion signal is fed to the host 100. The operation of the information controlling computer 104 ends with the receipt of the transmission completion signal at a step Sc9.

Meanwhile, the data controller 202 compares the unit ID code included in the transmission data with the unit ID codes stored in a memory thereof and selects the game unit 210 having the transmitted ID code at a step Sd10. The data controller 202 further applies a store instruction to the CPU 211 of the selected game unit 210 so that the transmitted playing instructions and the program ID code thereof are fed through the interface 220 and stored in the RAM 213 at a step Sd11. Therefore, the CPU 211 reads out the playing instructions as required, and indicates them on the display 217.

The transmission completion signal may be transmitted to the host after the playing instructions are store in the RAM 213.

Thus, it is not necessary to change a label showing the playing instructions whenever the game program is changed.

Figure 5:
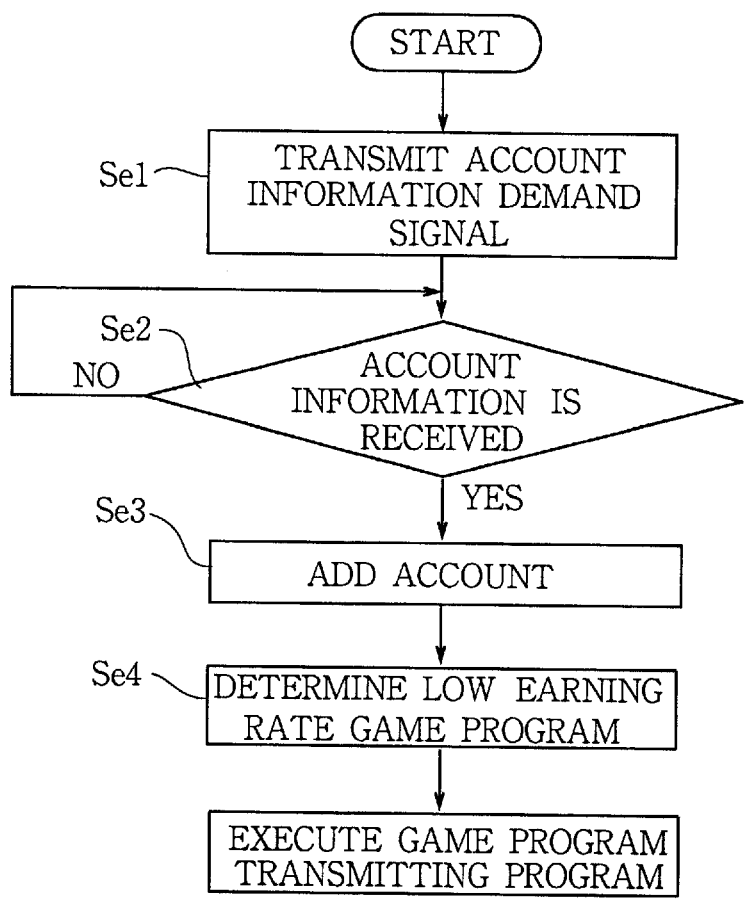
FIGS. 5a and 5b are flowcharts describing operations of the host and the terminal device, respectively, for replacing a video game program based on an account information.
Figure 5:
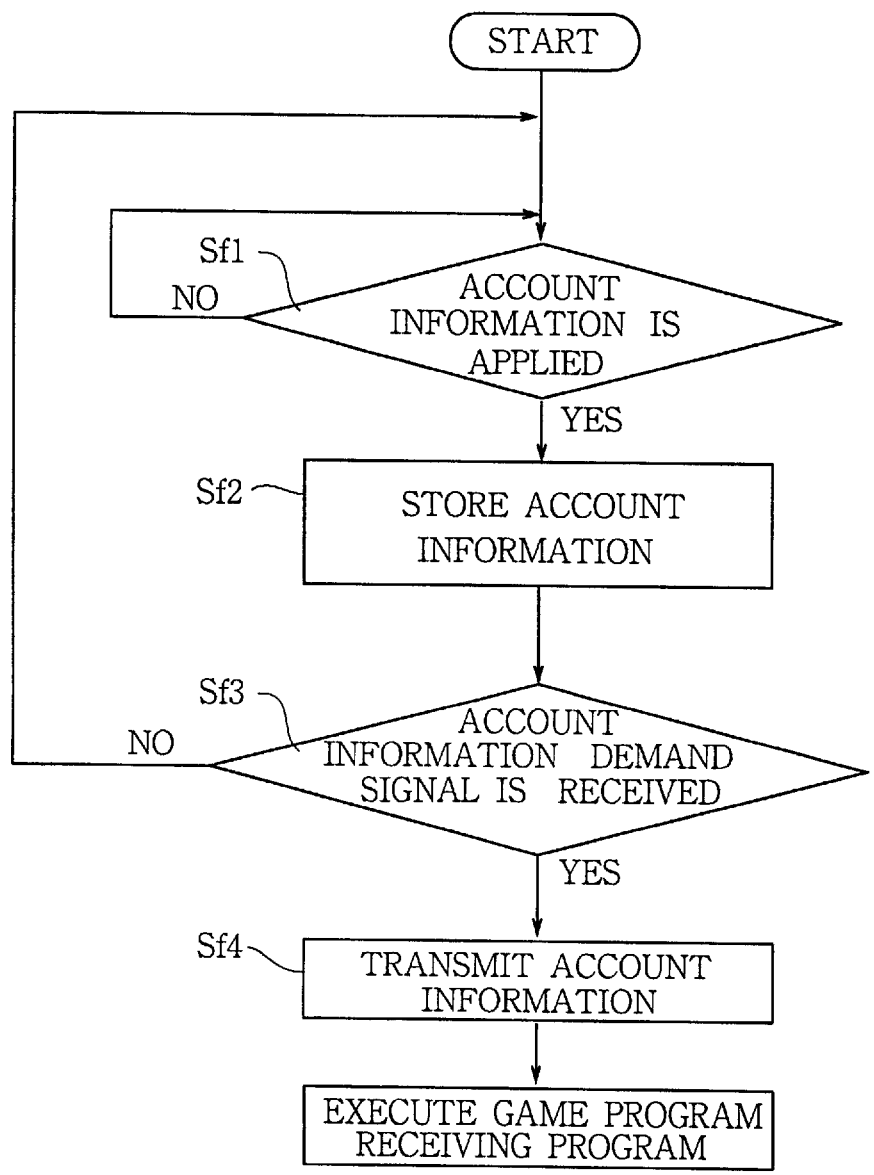

In accordance with the present invention, unpopular game programs stored in the game units 210 are automatically replaced with new programs. FIGS. 5a and 5b show operations of the information controlling computer 104 and the data controller 202, respectively, for changing the program in accordance with the account information.

Referring to FIG. 5b, the data controller 203 confirms at a step Sf1 that an account information including the amount of money inserted in the game unit and the ID codes of the game unit and the game program is applied from the game unit 210 to the account information collector 203. The account information together with the time and date of the transmission stored in the account information collector 203 at a step Sf2.

Referring to FIG. 5a, at a step Se1, the information controlling computer 104 of the host 100 periodically, for example, once a month, applies an account information demand signal to each terminal device 200 to have the account information stored in the account information collector 203 transmitted thereto. The data controller 202, detecting the demand signal at a step Sf3, retrieves the account information and the times and dates from the accounting information collector 203 and transmits the information to the host 100 through the modem 201 and the transmission line 300 at a step Sf4.

When the information controlling computer 104 of the host 100 receives the account information at a step Se2, the amount of the account of each game program installed in each game unit is added up at a step Se3. The information controlling computer 104 determines at a step Se4, game programs which were played only a limited number of times and hence having low earning rates. Thereafter, the information controlling computer 104 is operated to replace the determined game programs and their respective playing instructions with new game programs and playing instructions as described above with reference to FIGS. 3a, 3b, 4a and 4b.

Figure 6:
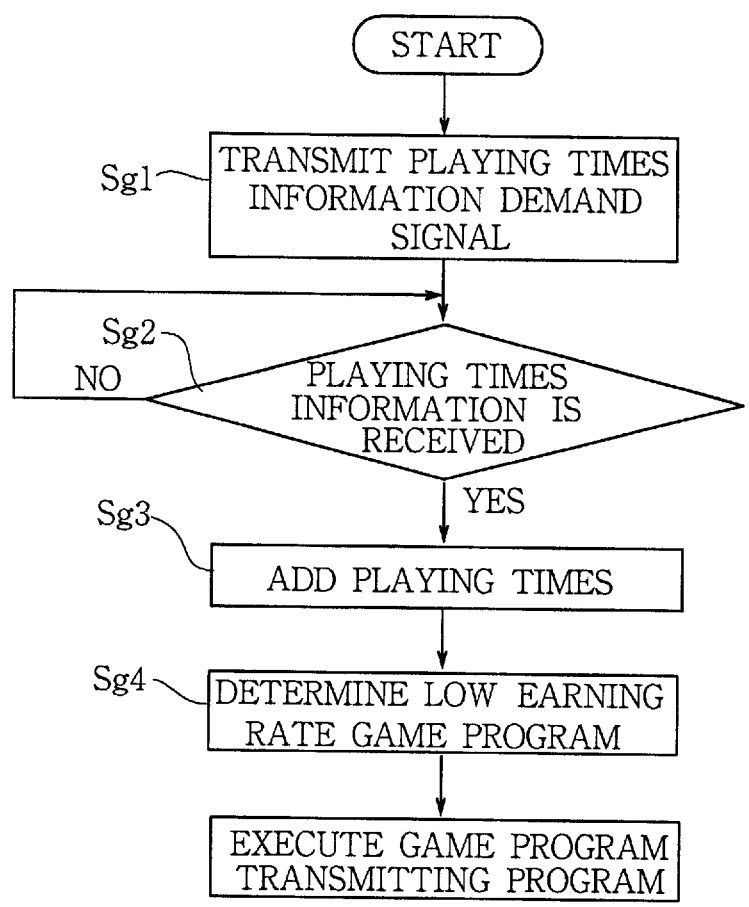
FIGS. 6a and 6b are flowcharts describing operations of the host and the terminal device, respectively, for replacing a video game program based on a playing times information.
Figure 6:
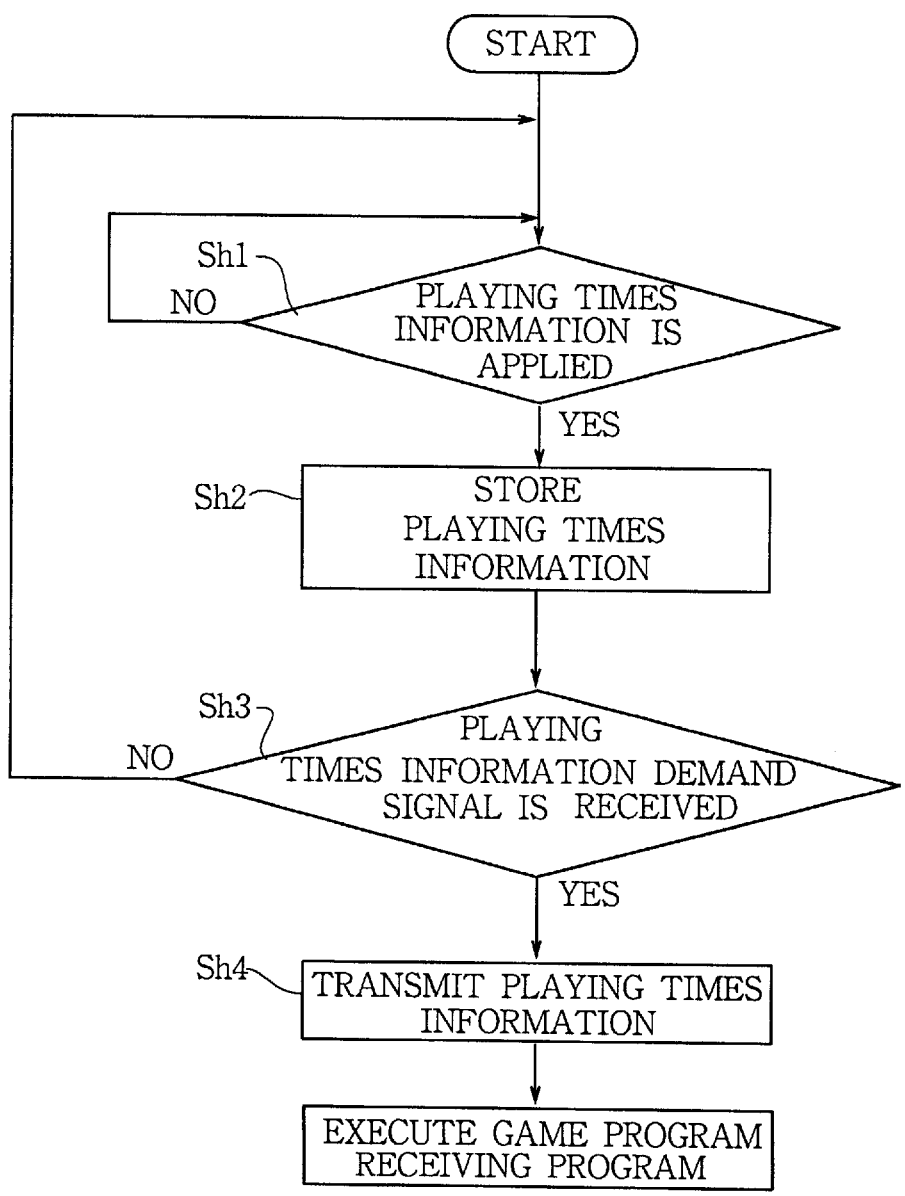

The unprofitable game programs may be similarly exchanged with another programs based on the playing times information which is stored in the playing times collector 204 as shown in FIGS. 6a and 6b.

Referring to FIG. 6b, the data controller 203 confirms at a step Sh1 that playing times information including the number of times each game program was played in each game unit and the ID codes of the game unit and the game program, is applied from the game unit 210 to the playing times information collector 204. The playing times information together with the time and date of the transmission is stored in the playing times information collector 204 at a step Sh2.

Referring to FIG. 6a, at a step Sg1, the information controlling computer 104 of the host 100 periodically, for example, once a month, applies a account information demand signal to each terminal device 200 to have the playing times information stored in the playing times information collector 204 transmitted thereto. The data controller 202, detecting the demand signal at a step Sh3, retrieves the playing times information and the times and dates from the playing times information collector 204 and transmits the information to the host 100 through the modem 201 and the transmission line 300 at a step Sh4.

When the information controlling computer 104 of the host 100 receives the playing times information at a step Sg2, the number of times each game program in each game unit was played is added up at a step Sg3. The information controlling computer 104 determines at a step Sg4, game programs which were played only a limited number of times and hence having low earning rates. Thereafter, the information controlling computer 104 is operated to replace the determined game programs and their respective playing instructions with new game programs and playing instructions as described above with reference to FIGS. 3a, 3b, 4a and 4b.

The user of the terminal device 200 thus need not trouble to manually calculate the revenue of each program in each game unit and ask the operator of the host 100 to change the program. The unprofitable game programs can be automatically determined and replaced with another instead.

Figure 7:
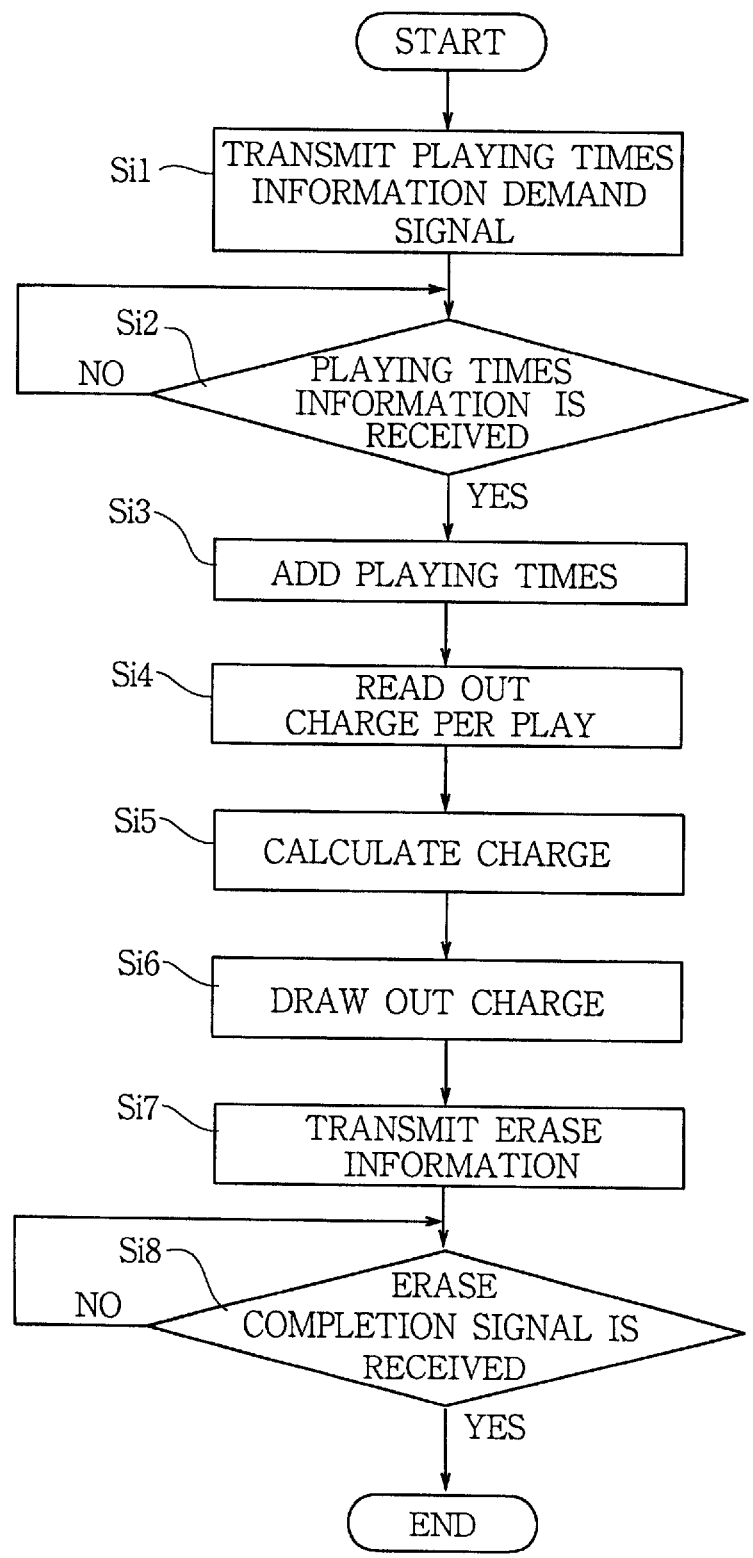
FIGS. 7a and 7b are flowcharts describing operations of the host and the terminal device, respectively, for collecting a charge based on the playing times information.
Figure 7:
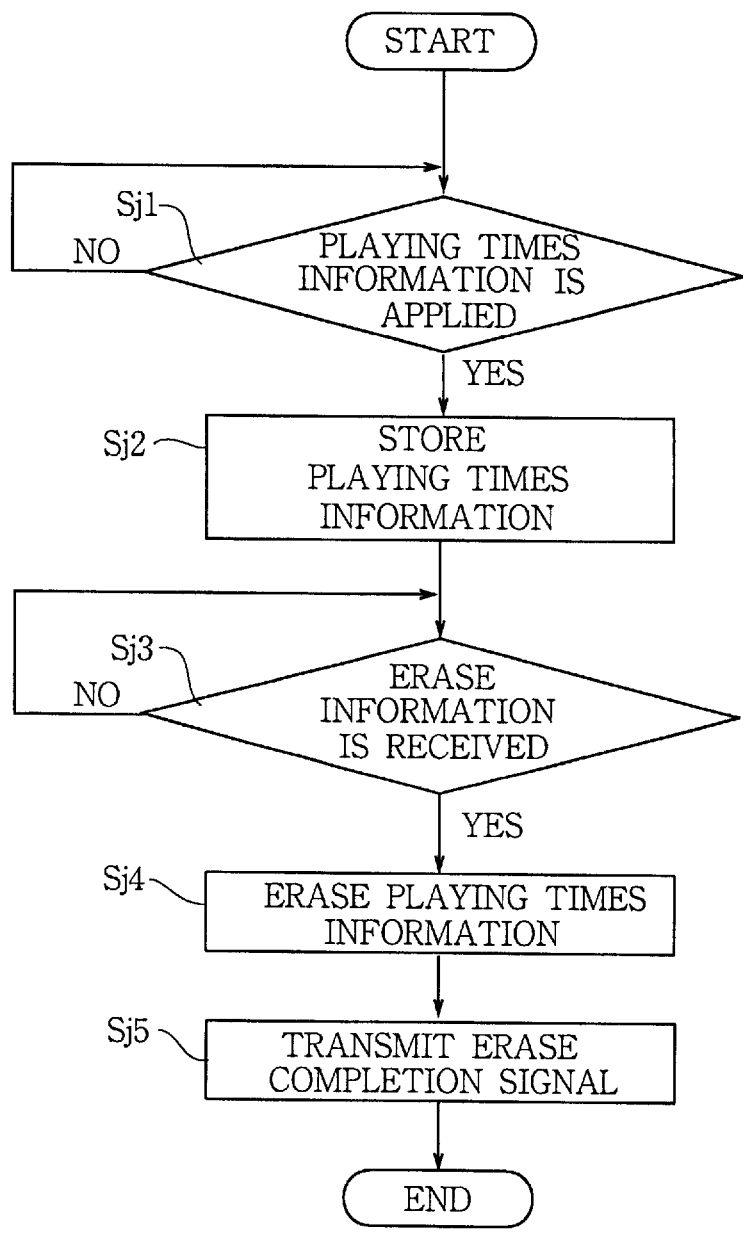

The operation for automatically calculating the game charge incurred on the user of the terminal device based on the playing times information and drawing the charge from a bank account is described hereinafter with reference to FIGS. 7a and 7b. FIGS. 7a and 7b describe the operations of the information controlling computer 104 of the host 100 and the data controller 202 of the terminal device 200, respectively.

The playing times information collector 204 stores information concerning how many times each game program in each game unit 210 was played, and ID codes of the game program and the game unit. The information controlling computer 104 of the host 100 periodically transmits the playing times information demand signal (step Si1). Upon receipt of the demand signal at a step Sj1, the data controller 202 of the terminal device 200 reads out from the collector 204 the playing times, game program ID code, game unit ID code, and the time and date on which the information was applied to the collector 204, and transmits the information to the host 100 through the modem 201 and the transmission line 300 at a step Sj2. When the information is detected at a step Si2, the playing times is counted in accordance with each game ID code and each game unit ID code at a step Si3. The charge per play is stored with the program ID code in the information controlling computer 104 or in the memory device 101. Thus the information controlling computer 104 reads out the charge per play of the game program at a step Si4. The charge per play is multiplied by the number of playing times so that the charge for using each game program is obtained. The charge of each game unit 210 is further calculated and added with those of other game units 210 in the terminal device. Hence the total charge payable by the user of the terminal device 200 is calculated at the step Si5. The period during which the charge is calculated is determined by the date which is included in the playing times information stored in the playing times information collector 204.

At a step Si6, the information controlling computer 104 of the host 100 then automatically draws out the charge from the bank account belonging to the user of each terminal device 200 by way of online processing.

To confirm that the game charge was drawn, and invoice, bill and a receipt are mailed to the user. The charge for replacing the game programs as hereinbefore described can also be added to the total charge.

Thereafter, the information controlling computer 104 executes a procedure for erasing the information stored in the playing times information collector 204. Namely, at a step Si7, the information controlling computer 104 transmits an erase information including an erase instruction, terminal ID code, game program ID code and the time and date of the input, to the data controller 202 of each terminal device 200. When the erase information is received at a step Sj3, the data controller 202 compares the transmitted terminal ID code with that stored in the memory thereof, and when they coincide with each other, the corresponding information in the playing times information collector 204 is erased at a step Sj4. When the information is erased, the data controller 202 produces an erase completion signal at a step Sj5. The program ends when the information controlling computer 104 receives the erase completion signal at a step Si8.

Figure 8:
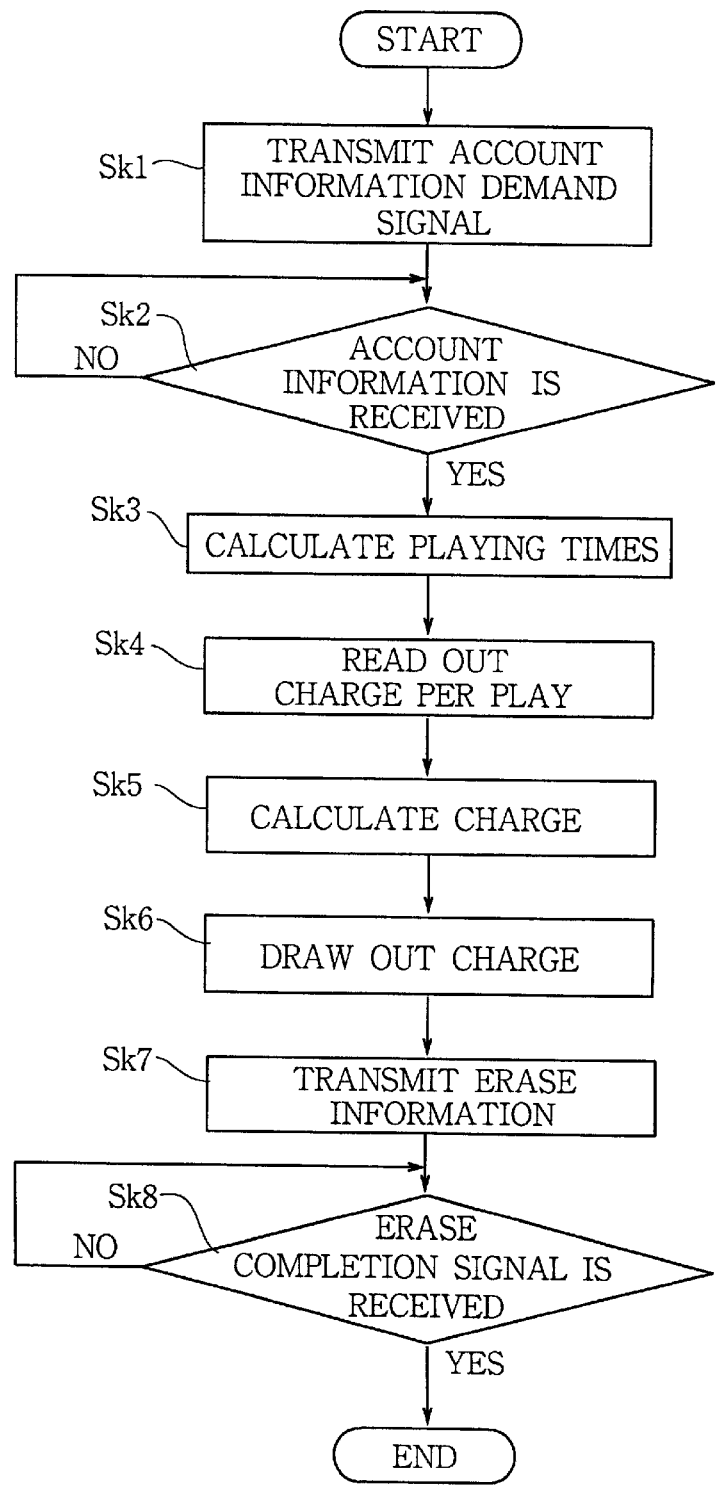
FIGS. 8a and 8b are flowcharts describing operations of the host and the terminal device, respectively, for collecting a charge based on the account information.
Figure 8:
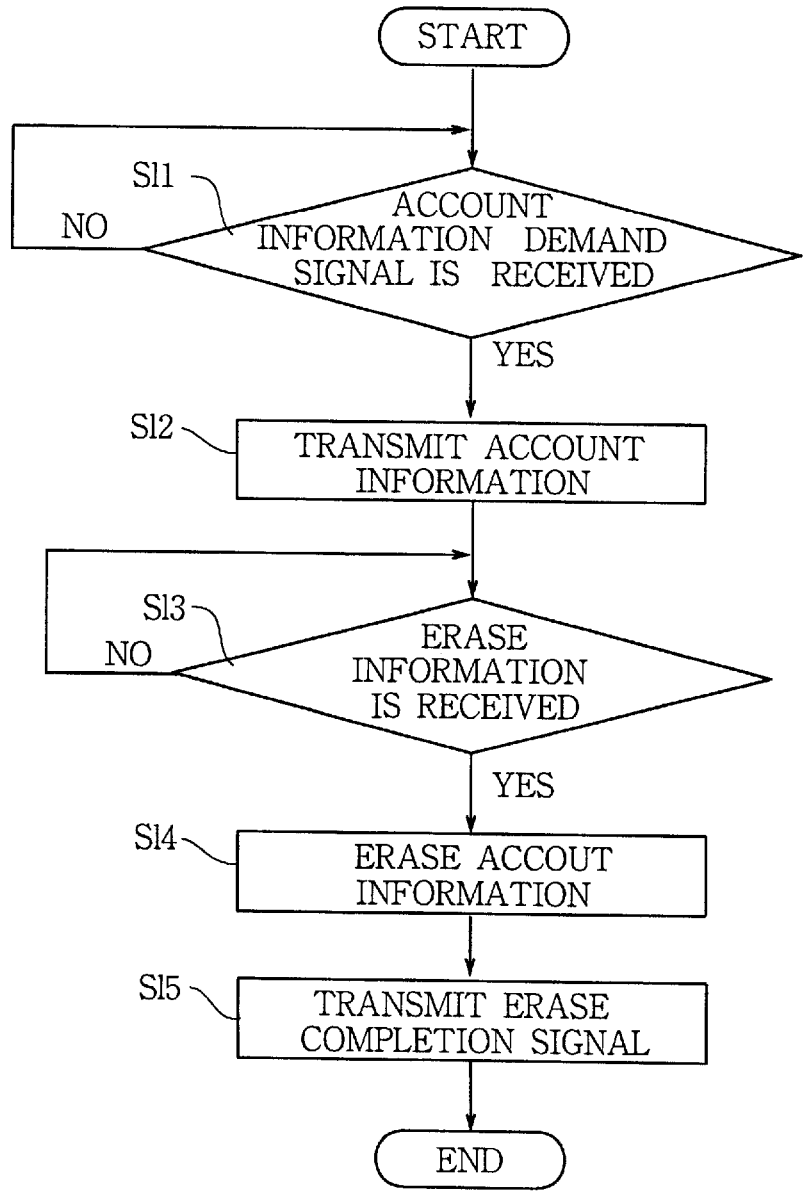

The charge can be calculated based on the account information and collected through the bank account in the similar manner as shown in FIGS. 8a and 8b.

The account information collector 203 stores information concerning the amount of money charged for executing each game program in each game unit 210, and ID codes of the game program and the game unit. The information controlling computer 104 of the host 100 periodically transmits the account information demand signal (step Sk1). Upon receipt of the demand signal at a step Sl1, the data controller 202 of the terminal device 200 reads out from the collector 203 the account, game program ID code, game unit ID code, and the time and date on which the information was applied to the collector 203, and transmits the information to the host 100 through the modem 201 and the transmission line 300 at a step Sk2. When the information is detected at a step Sk2, the playing times is calculated based on the account and counted in accordance with each game ID code and each game unit ID code at a step Sk3. The charge per play is stored with the program ID code in the information controlling computer 104 or in the memory device 101. Thus the information controlling computer 104 reads out the charge per play of the game program at a step Sk4. The charge per play is multiplied by the number of playing times so that the charge for using each game program is obtained. The charge of each game unit 210 is further calculated and added with those of other game units 210 in the terminal device. Hence the total charge payable by the user of the terminal device 200 is calculated at the step Si5. The period during which the charge is calculated is determined by the date which is included in the playing times information stored in the account playing times information collector 203.

At a step Sk6, the information controlling computer 104 of the host 100 then automatically draws out the charge from the bank account belonging to the user of each terminal device 200 by way of online processing.

To confirm that the game charge was drawn, an invoice, bill and a receipt are mailed to the user. The charge for replacing the game programs as hereinbefore described can also be added to the total charge.

Thereafter, the information controlling computer 104 executes a procedure for erasing the information stored in the playing times information collector 203. Namely, at a step Sk7, the information controlling computer 104 transmits an erase information including an erase instruction, terminal ID code, game program ID code and the time and date of the input, to the data controller 202 of each terminal device 200. When the erase information is received at a step Sl3, the data controller 202 compares the transmitted terminal ID code with that stored in the memory thereof, and when they coincide with each other, the corresponding information in the account information collector 203 is erased at a step Sl4. When the information is erased, the data controller 202 produces an erase completion signal at a step Sl5. The program ends when the information controlling computer 104 receives the erase completion signal at a step Sk8.

Thus the charge is automatically drawn out of the bank account so that the personnel of the host 100 no longer needs to make the rounds of the terminal devices 200 and collect the charge from each game units 210. Hence the collecting operation becomes easy and accurate. It is extremely convenient in cases where the number of the terminal devices 200 are large and are located distant from the host 100 and from one another.

Figure 9:
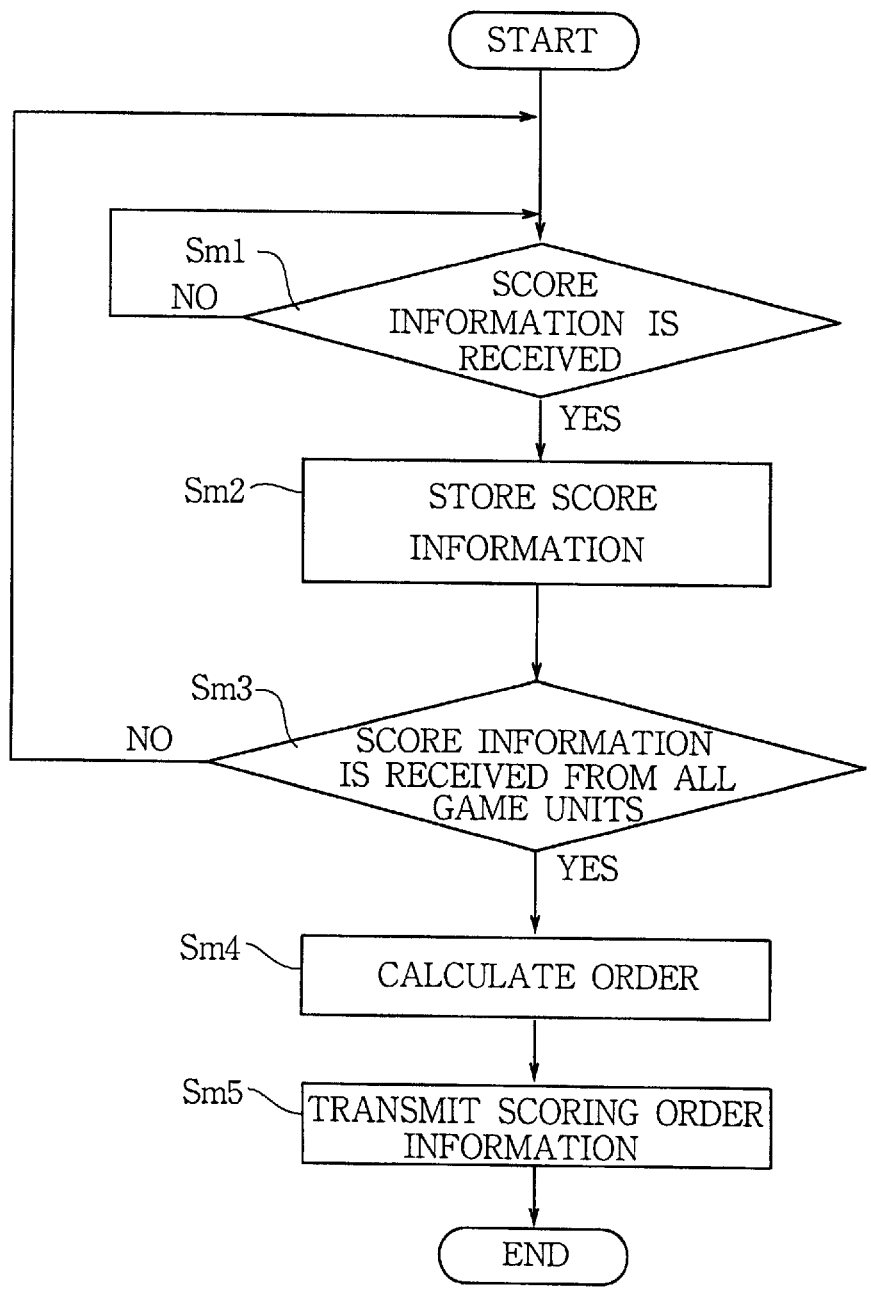
FIGS. 9a and 9b are flowcharts describing operations of the host and the terminal device, respectively, for showing an order of the points scored in each game unit.
Figure 9:
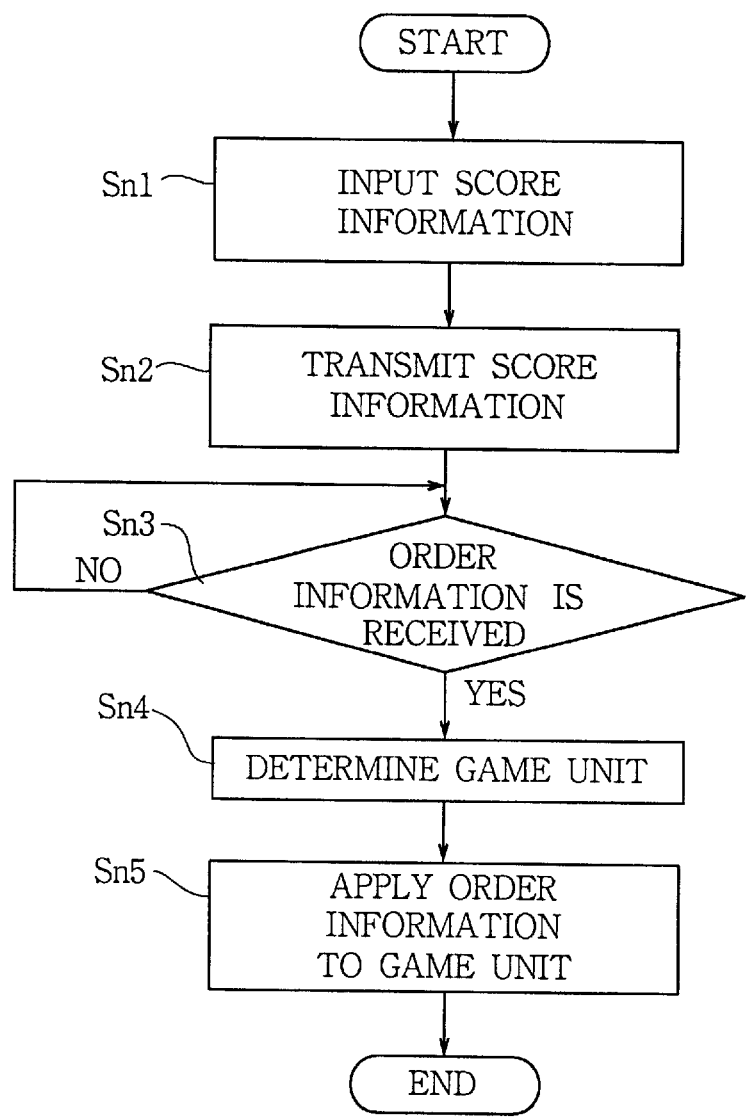

The operation for indicating the order of the game units 201 with respect to the point scored on each game unit will be described with reference to the flowcharts shown in FIGS. 9a and 9b.

A competition of a predetermined video game is held between a plurality of game units 210 of the terminal device 200 or between game units of the numerous terminal devices 200. When one of the competitors finishes playing the video game at a step Sn1 shown in FIG. 9b, the score of the game is transmitted from the CPU 211 to the data controller 202 through one of the interfaces 219 and 220, and other interfaces not shown. The data controller 202 appends the terminal ID code, game unit ID code and the game program ID code to the score information and transmits them to the host at a step Sn2. The information controlling computer 104 receives the information at a step Sm1 shown in FIG. 9a and stores the information in the internal memory thereof at a step Sm2.

The steps Sm1 and Sm2 are repeated until scores from all of the participating game units 210 are transmitted. When it is determined that the scores are all transmitted at a step Sm3, the scores within each game unit or within each terminal device are ranged in order of the achieved points. The information on the order including the score and order of a particular game unit, the ID code of the game unit, the terminal ID code of the game unit, program ID code, scores and orders of other game units and their ID codes, and the time and date, is transmitted to each terminal device 200 at a step Sm5.

When the order information is received at a step Sn3, the data controller 202 at the terminal device 200 determines at a step Sn4 the game unit 210 to which the information is to be transmitted based on the game unit code included in the information. Thereafter, the data controller 202 applies the order information to the determined game unit 210 at a step Sn5. The CPU 211 of the game unit 210 accordingly indicates on the display 215 or the display 217 the score and the order of the score of the game unit 210 and those of other game units.

Thus, when the same game is played on various game units of different terminal devices 200, the host 100 determines the order of each game unit based on the score and applies the order number to each terminal device. Hence, although the terminal devices 200 or the game units 210 may be located far away from one another, the order or each game unit can be easily informed to the competitors, thereby increasing the interest of the game.

The present invention may be modified to provide a ROM instead of the RAM 213 in each game unit 210, in which case the data controller 202 is provided with a ROM writer and the interface 219 is obviated. In order to replace an unprofitable game program stored in the ROM, the ROM is taken out of the game unit 210 by hand and set in the ROM writer. The ROM writer erases the game program and further writes a new video game program transmitted from the host 100 to the data controller 202. The playing instructions of the games are also stored and erased in the same manner.

From the foregoing it will be understood that the present invention provides a video game system wherein unprofitable video games are automatically replaced with other video games so that the user of the terminal device need not carry out tedious operations.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A video game system having a host and a terminal device connected to the host through a transmission line and having a plurality of game units comprising:

a first memory provided in the host wherein a plurality of video game programs are stored;

transmitting means for deriving a video game program from the first memory and for transmitting the program to the terminal device;

a second memory provided in the terminal device for storing the video game programs transmitted from the host;

a display provided on each of the game units for displaying the video game program stored in the second memory;

operating means for operating the game unit;

a third memory for storing information on playing condition of each of the video game programs; and determining means, provided in the host, for determining a video game program stored in the second memory is to be replaced by another video game program stored in the first memory in accordance with the information stored in the third memory, and based upon the determination for instructing the transmitting means to transmit the another video game program stored in the first memory to the terminal to automatically replace the video game program stored in the second memory, wherein said transmitting means transmits the another video game program to the terminal device.

2. The video game system according to claim 1 further comprising a charge receiving device provided in each game unit for receiving charge in order to execute the video game program, and the information stored in the third memory is an account of charge received by the charge receiving device.

3. The video game system according to claim 1 wherein the information stored in the third memory is the number of times each video game program is played.

4. The video game system according to claim 1 wherein the first memory and the second memory each further stores playing instructions of video game programs stored in each memory.

5. The video game system according to claim 1 wherein the transmitting means has appending means for appending a data error check code and a data correcting code to the video game program for checking and correcting the data therein, and the terminal device has processing means for checking and correcting the data in the transmitted video game program in accordance with the data error check code and a data correcting code, whereby the processing means applies a retransmission demand signal to the transmitting means when errors in the video game program cannot be corrected.

* * * * *